Patented Aug. 23, 1949

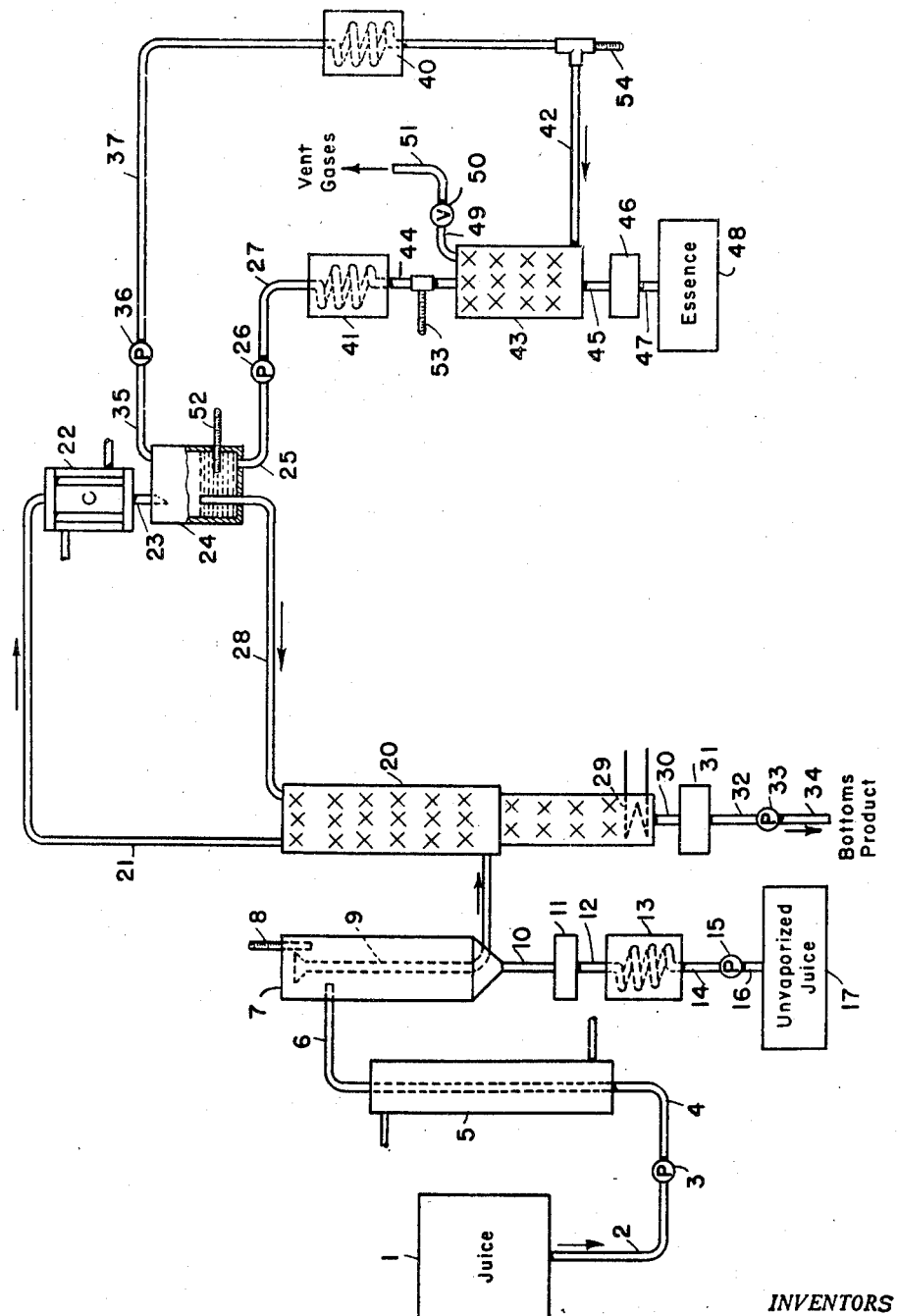

2,479,745

UNITED STATES PATENT OFFICE 2,479,745

PROCESS FOR THE PRODUCTION OF APPLE ESSENCE

Richard P. Homiller, Philadelphia, and Edward L. Griffin, Jr., Glenside, Pa., assignors to the United States of America as represented by the Secretary of Agriculture Application November 9, 1948, Serial No. 59,124

4 Claims. (Cl. 202—67)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the production of a highly concentrated apple essence containing substantially all of the volatile flavors present in fresh apples, and is an improvement over the processes disclosed in patent application Serial No. 616,953, filed September 17, 1945, and granted as Patent No. 2,457,315 and disclosed in "Recovery and Utilization of Natural Apple Flavors," by Milleville and Eskew, a publication of the Agricultural Research Administration, Bureau of Agricultural and Industrial Chemistry, United States Department of Agriculture, September 1944 (Circular AIC-63), and a supplement thereto, April 1945 (supplement to Circular AIC-63).

According to the processes of the above-cited references, fresh apple juice, prepared from sound apples (including the skin but minus the seed to avoid the almond flavor, or with the seed if almond flavor is desired) by beating up and juicing the apples, is quickly heated under pressure to a temperature considerably above the boiling point (320° F. for 3 seconds satisfactory, although more drastic heating may be used if the flavor of baked apples is desired) and is evaporated to cause initial evaporation of about 10% of the juice. The vapors thus obtained contain water, noncondensible gases, and the volatile flavors, and the unevaporated portion is separated from the vapors and may be concentrated in a usual manner.

The vapors thus obtained are fractionally distilled and condensed with refluxing to remove a large portion of the water. If no precautions are taken at this point, especially if the system operates under reduced pressure, the volatile flavors are materially lost, since they do not condense with the condensate. Therefore, the vapors from the condenser are efficiently contacted with the condensate at a pressure preferably not below atmosphere (although reduced pressure may be used) and at a cool temperature of the condensate (above freezing and up to 70° F., satisfactory), the higher temperatures being permissible with the higher pressures. As a result, the volatile flavors are absorbed by the condensate, thus to produce a condensate of 25 fold strength or over (25 times or over more concentrated in flavor than the original juice), and in which substantially all of the flavors are recovered.

Controlling the amount of refluxing controls the strength of the essence.

This essence can then be added to the concentrated juice which when reconstituted with water to the volume of the original juice cannot be distinguished therefrom by carefully conducted organoleptic tests.

The process of the references as above described is defective in that, regardless of the freshness of the apples or apple juice employed, alcohol is included in the essence produced. This amount of alcohol, although unobjectionable from the standpoint of utility of the essence, is sufficient to bring the process under the laws relating to distillation of a potable alcoholic beverage, thus making the process subject to regulation and taxing by the Bureau of Internal Revenue.

It is the object of the present invention so to modify the processes of the above-mentioned references as to materially reduce the amount of alcohol included in the essence produced.

According to the present invention, it has been found that if a smaller amount of the apple juice is initially evaporated (2 to 4% satisfactory), the amount of alcohol distilled and included in the essence is reduced sufficiently to eliminate the defect of the processes disclosed in the above-mentioned references, and yet to retain essentially all of the volatile flavors.

For a detail description of the invention, reference is made to the accompanying drawing illustrating schematically the apparatus used in carrying out the invention.

The fresh apple juice is continuously fed from a container 1 through a pipe 2, feed pump 3 and pipe 4 into heater 5 (as for example a single pass, steam jacketed coil), where it is heated to the desired temperature, this depending on the feed rate and heater steam temperature.

The heated juice, which may be partially in the vapor phase, depending on the pressure, passes through pipe 6 into a vapor-liquid separator 7 in form of an expansion chamber provided with a thermometer 8, where from 2 to 4% of the juice is separated as a vapor from the remaining unvaporized juice. The vapors are led away through vapor pipe 9 while the unvaporized juice is passed through pipe 10, through a liquid-level controller 11, which may be a float valve, for example, and then through a pipe 12 into cooler 13 where it is cooled if desired to avoid modification of the liquid juice. The liquid-level controller 11 prevents vapors from entering the cooler.

The cooled juice passes from cooler 13 through pipe 14, pump 15 and pipe 16 into container 17 and may be further processed in any desired manner. Pump 15 may be omitted if pressure conditions are such that the juice feeds by gravity.

The vapors passing through pipe 9 include the volatile flavors, water vapors, and certain noncondensible gases such as carbon dioxide, nitrogen and oxygen. These vapors are passed into fractionating column 20. In ascending the column, the vapors are fractionally distilled, the water vapors being condensed and drained to the bottom of the column, thus to remove the bulk of the water vapors. The concentrated vapors leave the column through vapor line 21 and are condensed, except for the noncondensible gases and the highly volatile flavors, in condenser 22, the condensate passing through pipe 23 and being collected in a sight-glass box 24 from which it is partially withdrawn at a constant rate through pipe 25, pump 26 and pipe 27, the remaining concentrate being returned through pipe 28 to the column 20 as reflux.

Regulation of the rate of flow through pump 26 as compared to the feed rate through pump 3 regulates the amount of reflux through pipe 28, and thus controls the concentration of the condensate. Thus, to obtain a 150 fold essence, pump 26 should withdraw the condensate at a rate equal to 1/150 the feed rate.

The bottom of column 20 is provided with a reboiler 29 which evaporates a portion of the water to generate vapors for aiding in the stripping operation, with the result that the water leaving the column through pipe 30 is substantially free of volatile flavors. This water is withdrawn through a liquid-level controller 31 similar to that at 11, pipe 32, pump 33 if required, and pipe 34, and is discarded.

If condenser 22 is a surface condenser and is operated sufficiently cold, and at a sufficiently high pressure, so that the vapors are efficiently contacted with the condensate in the condenser, it is possible to scrub the volatile flavors into the condensate in the condenser. The essential feature is that the volatile flavor vapors be in equilibrium with the liquid condensate, or be in such temperature and pressure state that, relative to the condensate, the flavors are absorbed. In this case pipe 35 may be vented to atmosphere (condenser operated at atmospheric pressure) or provided with a relief valve to increase the pressure.

Preferably, however, the vapors, or vent gases containing the noncondensible gases and very volatile flavors, are passed through pipe 35, pump 36, pipe 37, and cooler 40, the condensate from pipe 27 being separately cooled by feeding through cooler 41.

The vent gases after cooling are led through pipe 42 into the bottom of a scrubbing or absorption tower 43, which can be a bubble-plate column or a simple packed column, while the cooled condensate is led through pipe 44 into the top of the scrubbing tower. In this scrubbing tower, the condensate and vent gases move countercurrently in efficient contact, and the very volatile flavors are scrubbed into the condensate to produce the final condensed essence. This essence is discharged through pipe 45, liquid-lever controller 46, pipe 47 and collected in receiver 48. The remaining vent gases, free of substantially all of the volatile flavors, are discharged from the upper end of the tower through pipe 49 and relief valve 50, which may be set to obtain any desired pressure in the tower.

Thermometers 52, 53 and 54 are used to measure the temperature of the condensate from the condenser, the condensate after it is cooled, and the vent gas after it is cooled, respectively.

The following example exhibits the invention in greater detail.

EXAMPLE

Apple juice, containing 0.035% by weight of ethyl alcohol, pressed from a blend of equal parts by weight of Stayman, York, McIntosh, and Jonathan apples and screened through a 150-mesh screen was pumped at a steady rate of 10 gallons per hour to a heater consisting of a single, steam-jacketed, stainless steel, U-shaped tube 0.375 inch outside diameter, 0.307 inch inside diameter and 80 inches long. Steam pressure in the jacket of this tube was regulated so that the juice was heated to 218° F. in less than 10 seconds. The juice was then flashed to the vapor-liquid separator maintained at atmospheric pressure, whereupon approximately 3 percent by volume of the juice was vaporized. This 3 percent vapor fraction was separated from the stripped juice, i. e., the portion not vaporized, which was then immediately cooled and collected for further processing.

The 3 percent vapor fraction containing the volatile flavors was metered through an orifice and manometer calibrated in gallons of liquid vaporized per hour and then passed into a 2-inch inside diameter fractionating column, provided with a 500-watt reboiler, which was packed to a depth of 40 inches with ⅜ inch Raschig rings. The vapors enter the fractionating column between the reboiler and the packing. The vapors were passed through the column to a surface condenser, condensed and then cooled to about 70° F. in the condenser, the reflux being returned to the column at this temperature. That part of the condensate withdrawn as 150-fold essence was pumped through a cooler and cooled to about 40° F. The noncondensible gases from the condenser were also passed through a cooler, cooled to about 40° F. and then passed countercurrent to the cold essence product in a small absorption or scrubbing tower ¾ inch in diameter by 6¾ inches high and filled with ¼ inch Berl saddles. The top of this tower was vented to the atmosphere to discharge the vent gases, while the essence was withdrawn from the bottom of the tower.

Other similar experiments were conducted using however conditions which vaporized 6%, 8% and 10% of the juice, the results being shown in the table.

In the table, the "Fold of perception range" indicates the potency or strength of the essence by comparison with a standard essence and is expressed in the organoleptically measured fold of essence samples of known volumetric-fold concentration. The test consists in determining, under standardized conditions, the highest dilution at which the odor of essence is first detectable; small differences in essence potency being more readily detectable at low concentrations. The results tabulated show the range of volumetric-folds at which the panel was able to detect the first odor.

Table

| Juice evaporated, per cent | Alcohol content, per cent | Fold of Perception Range (threshold dilution) |
|---|---|---|
| 3 | 0.14 | 1/204 F to 1/365 F |
| 6 | 0.31 | 1/216 F to 1/412 F |
| 8 | 0.45 | 1/305 F to 1/446 F |
| 10 | 0.46 | 1/213 F to 1/446 F |

Taste tests on all the samples of the table were essentially the same.

The above tabulated data show that apple essences produced from a vaporized portion of fresh apple juice which constitutes less than 10 percent by volume of the fresh juice are similar in quality to that obtained under identical conditions on vaporizing 10 percent of the juice. They also show that the ethyl alcohol content of the essence decreases with the percentage of vaporization and is especially low if the essence is produced by vaporizing a portion of the juice approximating 3 percent. The concentration ranges detected by threshold dilution tests are of such magnitude that the strength or potency of the essences may be considered equal within the limits of the accuracy of the test.

Having thus described the invention, what is claimed is:

1. The process of recovering volatile flavors from apple juice comprising vaporizing from 2 to 4 percent of the apple juice, which vaporized portion contains water vapors, volatile flavors, and noncondensible gases, removing the bulk of the water vapors from the vaporized portion by fractional distillation, condensing the remaining vapors without condensing the noncondensible gases and very volatile flavors, and recovering substantially all of the very volatile flavors by efficiently contacting the noncondensible flavors and gases with a liquid at a temperature and pressure to cause absorption of the volatile flavors into the liquid, thereby to produce at least a 25-fold essence.

2. The process of claim 1, wherein the liquid is the condensate derived from the condensing step.

3. The process of claim 2 wherein a portion of the condensate is refluxed in the fractional distillation step to regulate the strength of the essence.

4. The process of claim 1, wherein the liquid is the condensate derived from the condensing step and the very volatile flavors are recovered by passing them together with the noncondensable gases and the condensate countercurrently through an absorption tower in efficient contact.

RICHARD P. HOMILLER.
EDWARD L. GRIFFIN, Jr.

REFERENCES CITED

The following references are of record in the file of this patent:

UNITED STATES PATENTS

| Number | Name | Date |
|---|---|---|
| 1,189,127 | Kellogg | June 27, 1916 |
| 1,367,725 | Trigg | Feb. 8, 1921 |
| 2,098,961 | Fronmuller | Nov. 16, 1937 |
| 2,342,962 | Noyes | Feb. 29, 1944 |
| 2,423,746 | Zahn | July 8, 1947 |
| 2,423,747 | Zahn | July 8, 1947 |